United States Patent [19]

Shimizu et al.

[11] Patent Number: 5,446,718
[45] Date of Patent: Aug. 29, 1995

[54] INFORMATION RECORDING AND REPRODUCING METHOD AND SYSTEM FOR DISC-SHAPED RECORDING MEDIUMS

[75] Inventors: Kikuo Shimizu, Hiratuka; Kazuo Shigematsu, Kitakatushika, both of Japan

[73] Assignee: Hitachi, Ltd., Tokyo, Japan

[21] Appl. No.: 27,045

[22] Filed: Mar. 4, 1993

[30] Foreign Application Priority Data

Mar. 4, 1992 [JP] Japan .................. 4-047120

[51] Int. Cl.$^6$ .................. H04N 5/76; G11B 5/09
[52] U.S. Cl. .................. 369/59; 360/46; 360/48; 360/51
[58] Field of Search .................. 360/48, 51, 46; 369/44.26, 59, 111, 275.3

[56] References Cited

U.S. PATENT DOCUMENTS 5,210,733  5/1993  Yamaguchi et al. .................. 369/59
5,255,261 10/1993  Iida et al. .................. 369/275.3

Primary Examiner—Aristotelis Psitos
Assistant Examiner—Won Tae C. Kim
Attorney, Agent, or Firm—Bardehle, Pagenberg, Dost, Altenburg, Frohwitter, Geissler and Partners

[57] ABSTRACT

A MCAV optical disc read/write system with a postscript type of recording medium is, which uses a pit edge method of recording information in spiral physical tracks of the medium. The spiral physical tracks are grouped into logical tracks in which a single track address is assigned to each logical track. The logical tracks in turn are grouped into circumferential zones. The number of physical tracks constituting a logical track in adjacent circumferential zones, and the number of track sectors per logical track are set such that the increment in the number of sectors per physical track in proceeding from an inner one to an outer one of such zones is controlled to minimize rate changes in the read/write clock frequency at zone boundaries. Sector addresses thereby may be read even when a read/write head is positioned in a wrong one of adjacent zones.

3 Claims, 11 Drawing Sheets

PRIOR ART

| 120 | 121 | 122 | 123 | 124 |
|---|---|---|---|---|
| CLOCK INFO (LINE 52) | LOGICAL TRACK ADDRESS | PHYSICAL TRACKS PER ZONE | PHYSICAL TRACKS PER LOGICAL TRACK | READ/WRITE CLOCK FREQUENCY |
| 0 | 0~249 | 500 | 2 | $f_0$ |
| 1 | 250~499 | 500 | 2 | $f_1$ |
| 2 | 500~749 | 500 | 2 | $f_2$ |
| ⋮ | ⋮ | ⋮ | ⋮ | ⋮ |
| $l$ | $250 \cdot l$ ~$250 \cdot (l+1)-1$ | 500 | 2 | $f_l$ |
| ⋮ | ⋮ | ⋮ | ⋮ | ⋮ |
| 39 | 9750~9999 | 500 | 2 | $f_{39}$ |

$0 \leq l \leq 39$

| CLOCK INFO (LINE 52) 125 | LOGICAL TRACK ADDRESS 126 | PHYSICAL TRACKS PER ZONE 127 | PHYSICAL TRACKS PER LOGICAL TRACK 128 | READ/WRITE CLOCK FREQUENCY 129 |
|---|---|---|---|---|
| 0 | 0~249 | 500 | 2 | $f_0$ |
| 1 | 250~499 | 500 | 2 | $f_1$ |
| ⋮ | ⋮ | ⋮ | ⋮ | ⋮ |
| $l$ | $250l$ ~$250(l+1)-1$ | 500 | 2 | $f_l$ |
| ⋮ | ⋮ | ⋮ | ⋮ | ⋮ |
| 19 | 4750~4999 | 500 | 2 | $f_{19}$ |
| 20 | 5000~5999 | 1000 | 1 | $f_{20}$ |
| 21 | 6000~6999 | 1000 | 1 | $f_{21}$ |
| ⋮ | ⋮ | ⋮ | ⋮ | ⋮ |
| $j$ | $1000 \cdot (j-20)+5000$ ~ $1000 \cdot (j-20+1)+4999$ | 1000 | 1 | $f_j$ |
| ⋮ | ⋮ | ⋮ | ⋮ | ⋮ |
| 29 | 14000~14999 | 1000 | 1 | $f_{29}$ |

$0 \leq l \leq 19, 20 \leq j \leq 29$

FIG. 17

INFORMATION RECORDING AND REPRODUCING METHOD AND SYSTEM FOR DISC-SHAPED RECORDING MEDIUMS

CROSS-REFERENCE TO RELATED APPLICATIONS

A Patent Application on this invention was first filed on Mar. 4, 1992 in Japan as Japanese Patent Application No. 04-47120, upon which a claim of priority is based.

FIELD OF THE INVENTION

This invention generally relates to the recording of information on a disc-shaped recording medium, and the reading of such information from the recording medium, and more particularly relates to a Modified Constant Angular Velocity (MCAV) type of optical read/write system using a pit edge method of recording information on a postscript type of optical, disc-shaped recording medium having spiral recording tracks arranged in circumferential zones, and reproducing such information even when a read/write head is erroneously positioned in a wrong one of adjacent zones.

BACKGROUND OF THE INVENTION

In recording and reading information recorded on an optical disc, the read/write systems fall generally into three categories.

The first, a Constant Linear Velocity or CLV system performs a read or write operation while the disc is being turned at a constant linear velocity. The CLV system is characterized by a high recording density, but is plagued by a low access rate because the rotational speed of the disc must be changed to accommodate the reading or writing of information at different radial positions on the disc.

A second type of optical disc read/write system is referred to as a Constant Angular Velocity or CAV system, wherein the disc is turned at a constant angular velocity during a read or write operation. The CAV system, however, is characterized by a low recording density and non-uniform signal quality across the recording medium of the disc. Japanese Patent Application No. 37849/1990, however, discloses a method of achieving uniform signal quality across the recording medium, and increasing recording capacity by controlling the recording pit length or recording domain length of a recording medium in accordance with the recording characteristics of the medium.

Japanese Patent Application Nos. 177404/1985 and 117448/1985 disclose a third type of read/write system referred to as a Modified Constant Angular Velocity or MCAV system, wherein the disc is rotated at a constant angular velocity and the read/write frequency is increased in accordance with the linear velocity of the disc position in registration with the read/write head, as the read/write head travels from inner to outer circumferences of the recording medium. The MCAV system provides a higher recording density than the CAV system.

Referring to FIG. 1A, the format of a recording medium of an optical disc 1 as used in the prior art is shown, wherein circumferential tracks 2a–2g of a recording area 2 are each comprised of plural sectors 3.

The innermost circumference of each track identifies a frequency change boundary 4 as a read/write head sweeps across the recording medium. The read/write frequency at which information is either recorded or read from a track is constant within a track, but may change from track to track as indicated by the frequency change boundaries.

The recording medium format of FIG. 1 also may be formed so that plural adjacent ones of the tracks form zones within which the read/write clock frequency remains constant. Thus, the recording medium may be constituted of plural concentric zones, wherein the read/write clock frequency remains constant within a zone, but changes from zone to zone at its innermost and outermost concentric boundaries.

FIG. 1B illustrates a format of a recording medium 1' used with MCAV systems wherein spiral tracks including tracks 2a', 2b', 2c', and 2d' are grouped in a first zone and spiral tracks including tracks 2e', 2f, 2g' and 2h are grouped into a second zone. Each of the spiral tracks are comprised of a plurality of sectors 3'. The zones are separated by a boundary 4' which indicates the occurrence of a read/write clock frequency change.

Within each zone, the sectors are radially aligned, which contributes to cross-talk of sector header signals between adjacent tracks. Further, the number of sectors per zone increase by one in proceeding from the innermost track to the outermost track.

None of the above prior art systems disclose a method or system for holding to a small magnitude the read/write frequency changes occurring between adjacent zones of recording tracks on the recording medium of a small diameter disk, for reducing cross-talk between sector header signals of adjacent tracks, or for increasing the recording capacity of small disk systems having few zones because of a radially short recording medium.

Further, none of the above prior art addresses the problem of frequency synchronization between the read/write clock frequency and the recording frequency of data stored on a recording medium at a particular track position, under circumstances where the read/write head of an optical disc system is incorrectly positioned with respect to a desired sector address on the recording medium. For example, in a MCAV system where the read/write frequency differs from zone to zone, a positioning of the read/write head in a zone other than the zone of the desired sector address may result in such a disparity between the read/write clock frequency of the read/write head, and the recording frequency of the information as recorded on the disc, that the address portion of a sector of information cannot be read.

This circumstance is illustrated in FIG. 2 where a read/write clock frequency change boundary 4 is sandwiched between two zones, 5 and 6, each of which is comprised of plural tracks such as tracks 7 and 8. The dashed circle 9 in registration with track 7 of zone 5 indicates the desired position of the read/write head. The circle with interior cross marks 10 in registration with track 8 of zone 6 indicates the actual position of the read/write head which occurred as a result of errors or inaccuracies. If the change in frequency occurring between zones 5 and 6 at boundary 4 is too large, the read/write system may not be able to sufficiently synchronize the read/write clock frequency with the recording frequency of data recorded on the medium. Sector addresses then cannot be read, and it cannot be determined whether correct data is being reproduced.

While two methods have been employed to overcome this problem, neither has been completely successful. For example, an external scale or the like may be used to determine the position of a read/write head with respect to the disc. Further, a clock frequency for the zone in which the read/write head is positioned may be generated based upon the external scale measurement.

In the alternative, the read/write frequency of a read/write head may be set to the recording frequency of a desired zone before or during the movement of the head, and thereafter synchronized with the data of the address portion of a desired track within the zone.

The former external scale method lacks accuracy in recording and may result in a misreading of a zone address.

Further, the method of setting the clock frequency of a target zone in advance must include the ability to recognize the zone address even if the head is positioned in an incorrect adjacent zone. Because of the large difference in recording frequencies between zones as occurs in prior art systems, the synchronization of the read/write frequency of the head with such recording frequencies may be difficult. As a result, the reading of a sector address may not be possible.

In the case of an MCAV system using an optical disc medium of 5.25 inches radius, for example, if an innermost zone has twenty sectors for one track, a next outer zone has twenty-one sectors per track so that the read/write or clock frequency will change by 5% between the two zones. In order to recognize an address, the clock frequency has to be synchronized with a clock pattern appearing in the address data of each sector of a zone.

The read/write system thus must have the flexibility to synchronize frequencies differing by five percent.

In order to increase the recording capacity in an MCAV system, the recording capacity per track has to be increased from zone to zone in proceeding from inner to outer circumferences of the recording medium. If the capacity were increased by one sector per track, however, a considerable number of tracks in each zone would be required to widen the zone width.

A zone division of an optical disc medium in the prior art is accomplished each time the number of sectors per physical track changes. By way of background, a sector length $S_0$ is given by the following equation, where the innermost track of the innermost zone has the sector length $S_0$, the track pitch has a length of d mm, the number of physical tracks constituting a zone is N, the innermost track has a radius of R mm, and the number of sectors contained in the innermost physical track is n:

$$S_o = 2\pi \cdot (R + 0 \cdot N \cdot d)/(n+0) \text{ (mm)}$$

As a result, a sector length $S_1$ in the innermost track of the next occurring outer zone, with the number of sectors per physical track incremented by 1, is given by:

$$S_1 = 2\pi \cdot (R + 1 \cdot N \cdot d)/(n+1) \text{ (mm)}$$

If the sector lengths in the innermost track at the frequency change position in each zone are equal, and the number of sectors per physical track is constant in all of the physical tracks, the following equation may be deduced from the above two equations:

$$S_o = 2\pi \cdot N \cdot d \text{(mm)}$$

This frequency change position implies that the track length is longer by the sector length $S_o$ than that of the switching position (innermost track) of the immediately preceding zone.

Further, the sector length in the innermost zone slightly changes from $S_o$ (of the innermost physical track) to $(n+1)S_o/n$ (of the outermost physical track).

By way of example, in an optical disc medium formatted with a track pitch d of 0.0015 mm, a sector length $S_o$ of about 9.42 mm, a number of physical tracks per zone of N=1,000, an innermost track radius of R=30 mm, a number of sectors per innermost physical track of n=20, and an outermost recording area circumference radius of 60 mm, the number of zones is determined to be 20, and a sector length in the innermost track of each zone is determined to be 9.42 mm.

If the zone arrangement of the recording medium is as described above, the transition of the read/write frequency changes stepwise in equal steps as illustrated in FIG. 3 by graph 11. Between adjacent zones, the read/write frequency will change linearly by 5% at the inner circumference and by 2.5% at the outer circumference. The change of 5% in the read/write clock frequency in the innermost circumference of a zone is determined uniquely from the number of sectors in the innermost circumference.

SUMMARY OF THE INVENTION

In accordance with the invention, a MCAV type of read/write optical disc system is provided, wherein the disc is rotated at a constant angular velocity, and the recording area of the disc is formatted in spiral physical tracks. Logical tracks each comprised of one or more physical tracks are assigned a logical track address such that the number of sectors per logical track address, and thus the read/write clock frequency, increase in proceeding from the innermost to the outermost circumference of the disc.

The logical tracks are grouped in circumferential zones. The number of physical tracks constituting a logical track in adjacent circumferential zones, and the number of sectors per logical track in such zones are set such that the increment in the number of sectors per physical track in proceeding from the inner one to the outer one of such zones is substantially equal to or less than a specified value. The rate of change of the read/write clock frequency between zones thereby is held to a low value.

In a preferred embodiment, the number of physical tracks per logical track is two, the sector lengths of adjacent logical tracks separated by zone boundaries are equal, and the increment in the number of sectors per physical track in proceeding from inner to outer circumferential zones is equal to or less than one.

One object of the invention is to control the rate of change of the read/write clock frequency between adjacent zones so that synchronization between a header signal of a sector accessed by the read/write head, and the read/write clock frequency can be made, even when the read/write head is erroneously positioned in a wrong one of adjacent zones.

Another object of the invention is to increase the recording capacity of the disc medium without compromising the ability to control the rate of change of the read/write clock frequency between adjacent zones.

BRIEF DESCRIPTION OF THE DRAWINGS

FIG. 17 is a further transformation table used by the main control circuit 49 of FIG. 10;

DESCRIPTION OF PREFERRED EMBODIMENTS

Preferred embodiments of the invention will now be described with reference to the above drawings.

Figure 4:
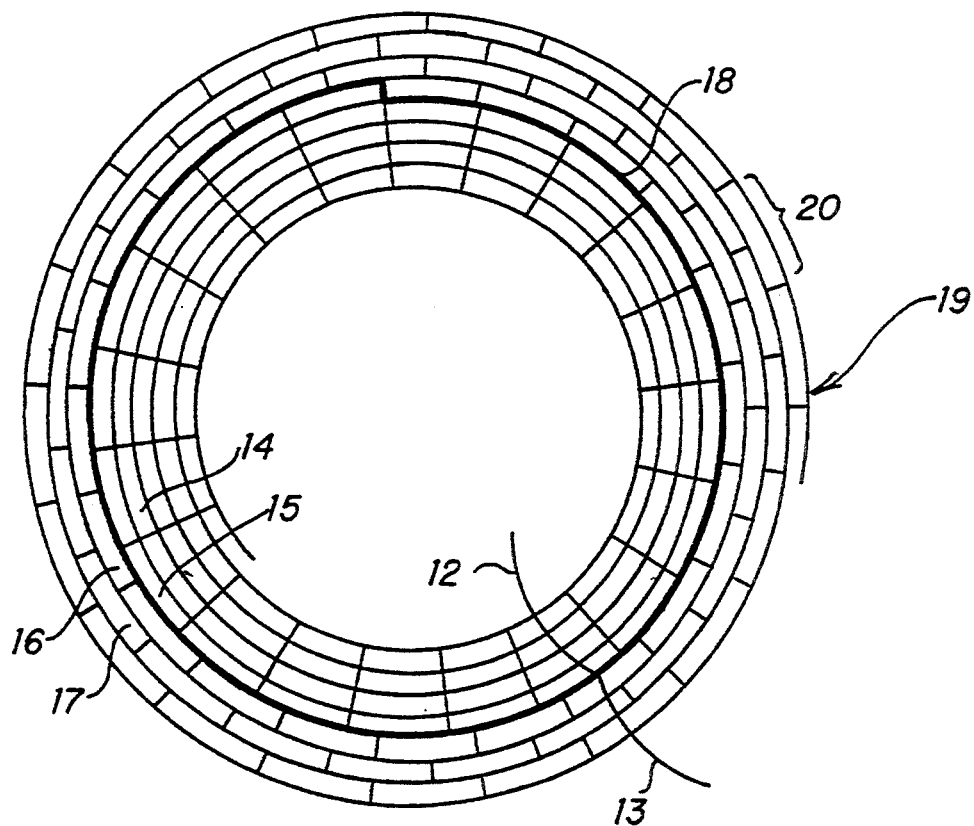
FIG. 4 is a diagram of the physical layout of a disc-shaped recording medium in accordance with the invention.

A recording medium format for an optical disc in accordance with the invention is shown in FIG. 4, where two zones 12 and 13 respectively are comprised of spiral tracks 14 and 15 adjacent to the radially inner side of zone boundary 18, and spiral tracks 16 and 17 adjacent to the radially outer side of zone boundary 18.

The zone boundary 18 also identifies the position of the read/write head of an optical disk system where a change in the read/write clock frequency occurs.

Each of the spiral tracks comprising the recording medium of the disc 19 consists of a plurality of information sectors such as sector 20. Further, plural ones of the spiral tracks comprising a zone may have an identical track address. By way of example, the tracks 14 and 15 of zone 12 may constitute a logical track having a single track address. Likewise, the tracks 16 and 17 of zone 13 may constitute a logical track with a single track address different from that of the logical track of zone 12.

In the case where track pairs, by way of example, define a zone and have a same track address as described above, the track pairs are arranged with sectors 20 such that the number of sectors per track pair increases by one as the recording medium of disc 19 is traversed radially outward.

Figure 5:
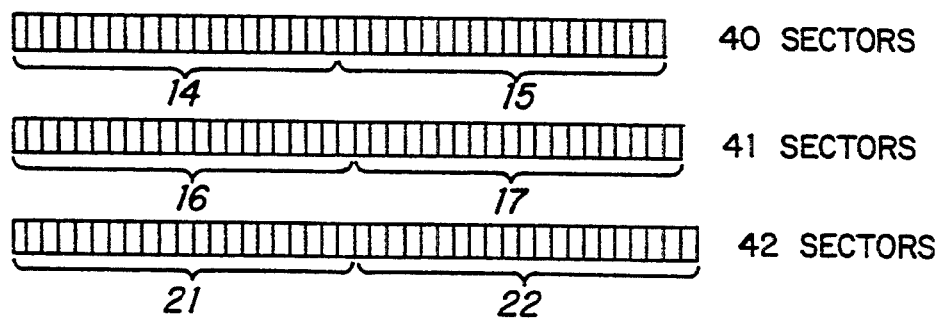
FIG. 5 is a diagram of the sectors of adjacent tracks comprising the recording surface of a disc-shaped medium in accordance with the invention.

Referring to FIG. 5, if the spiral tracks 14 and 15 include 40 sectors, the next radially outward track pair 16 and 17 will include 41 sectors. If there were a next succeeding radially outward track pair, tracks 21 and 22, the pair would include 42 sectors. Thus, the number of sectors per succeeding track pair increases one by one as the recording medium is traversed in a radially outward direction.

Figure 6:
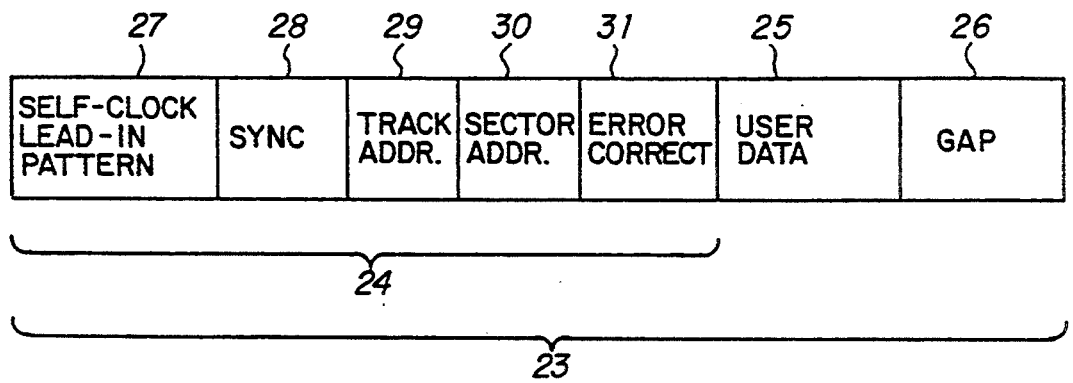
FIG. 6 is a diagram of the structure of a sector of a physical track of a disc-shaped recording medium.

Each of the sectors of a track is formatted as illustrated in FIG. 6, where the sector 23 includes a header signal 24, user data 25 and a gap 26. The header signal 24 includes a self clock lead-in pattern 27, a synchronizing signal 28, a track address 29, a sector address 30, and an error correcting signal 31.

In accordance with the invention, the header signal 24 is formed in advance of a data recording as a "pre-pit" laser beam irradiation at the head of a sector as will be more fully explained below. The sector address 30 will increase one by one, sector by sector, from the lead to the end sector of a track.

The increase in the number of sectors per logical track in a radially outward direction corresponds to a step-by-step increase in the read/write clock frequency as the read/write head traverses the boundaries of succeeding zones. When the change in read/write clock frequency is small as the read/write head crosses a zone boundary, synchronization between the read/write clock frequency and the self-clock lead-in pattern of a sector being accessed is easily achieved. The address of the sector thereupon may be read to determine whether the read/write head is correctly positioned, even if the head initially is positioned in a wrong adjacent zone.

In small discs having an outer circumference recording medium diameter such as the now common 5.25, 3.5 or 2.5 inch discs, the number of sectors per track and per zone are determined from recording and reproducing characteristics, and cannot be freely increased through use of prior art techniques. Further, because of the low number of zones and tracks per zone available on a small disc, it has not been possible through use of prior art methods to reduce an increase in sectors per zone to less than one.

In a disc system in accordance with the invention, however, where the number of sectors may be increased by one over a plurality of tracks, the increase may be allocated among the tracks. For example, where an increase of one sector per zone occurs in zones having two tracks, an increment of 0.5 sectors per track may occur. Alternatively, an increase of two sectors in three physical tracks will provide a sector increase of 0.67 sectors per track. Thus, sector increments less than or equal to one may be achieved to control the change in read/write clock frequency, and thereby ensure that sufficient synchronization may be achieved to read sector addresses.

In the case where an identical track address is assigned to two physical tracks, and the sector number between the zones is incremented by 1, the sector length of the innermost track of the innermost zone may be determined as follows:

$$S_o = 2\pi \cdot N \cdot k \cdot d \text{(mm)},$$

where N is the number of physical tracks in a zone, d is the track pitch in millimeters, and k is the number of physical tracks having an identical track address. In this example, k has a value of two. Hence, in a medium having 1000 physical tracks per zone and 20,000 physical tracks in 20 zones, there are now 500 logical tracks per zone. Thus, $N=500$, and the zones can be switched every five hundred physical tracks to divide the recording medium into 40 zones. In addition, the sector length $S_o$ is equal to 9.42 mm where the pitch d is 0.0015 mm.

Figure 3:
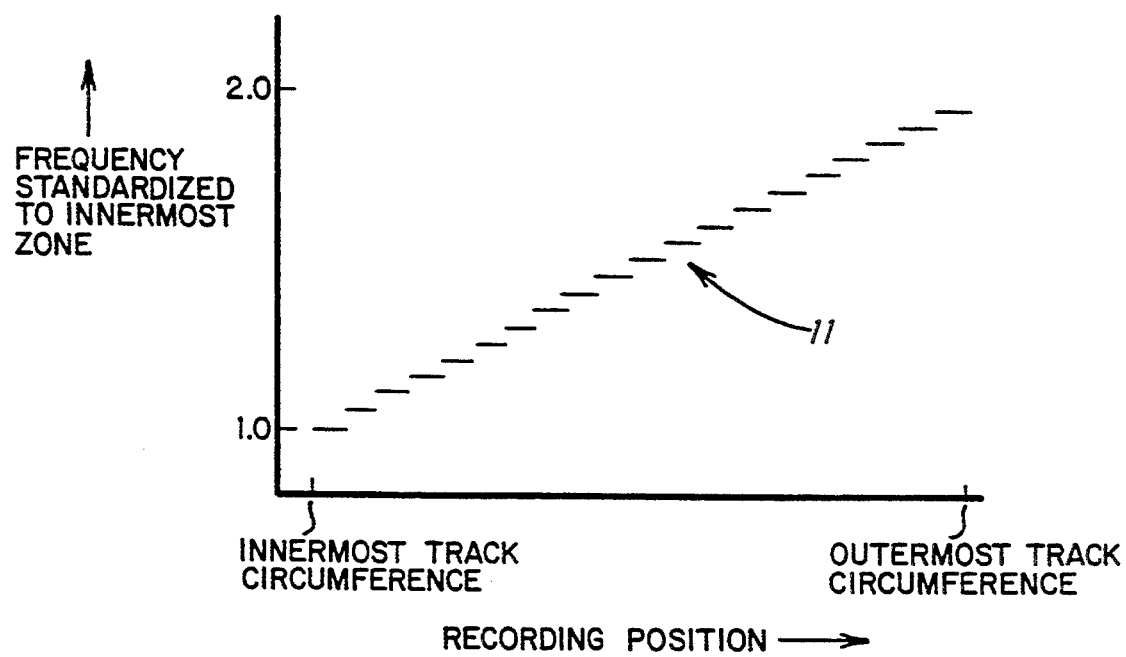
FIG. 3 is a graph of transitions occurring in the frequency of a read/write clock as occurs in prior art systems.
Figure 7:
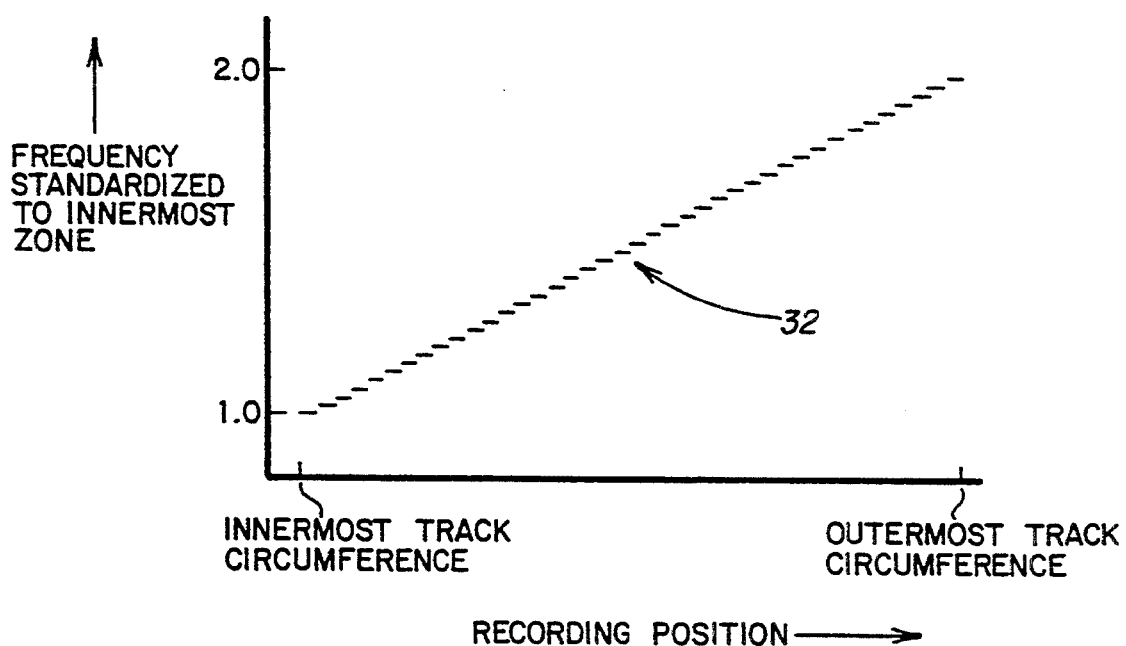
FIG. 7 is a graph of transitions occurring in the frequency of a read/write clock in an optical disk system in accordance with the invention.

In the embodiment described above, the read/write clock frequency of each zone may be represented by the graph 32 of FIG. 7, where the equal distanced steps in frequency increments are more numerous than as previously shown in FIG. 3 for a prior art embodiment. The resolution of read/write clock frequency changes thus is better controlled.

Figure 8:
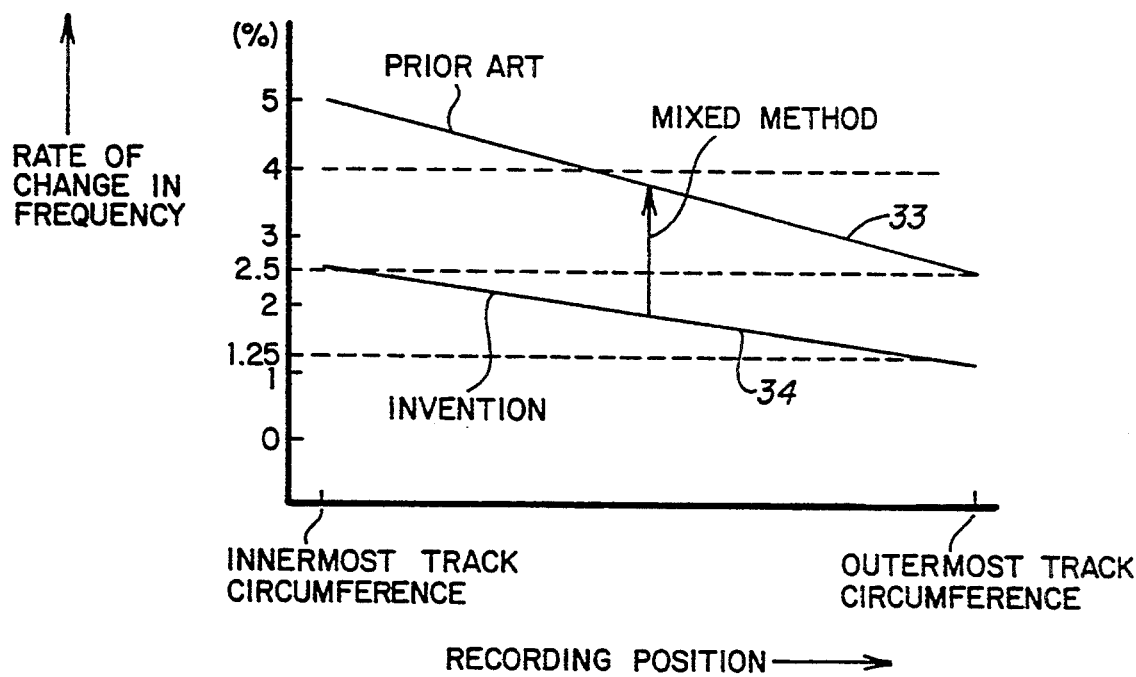
FIG. 8 is a graphical diagram of the rate of change in frequency of a read/write clock in a prior art system and in a system in accordance with the invention.

Moreover, as shown in FIG. 8, for read/write systems in accordance with the invention as illustrated by graph 34, it is found that the percent change in frequency of the read/write clock in crossing boundaries between adjacent zones is 2.5% at the inner circumference and 1.25% at the outer circumference. The percent change in frequency of the read/write clock in the present embodiment thus is one-half of that of the prior art as illustrated by graph 33 of FIG. 8.

The change in read/write clock frequency between adjacent zones thus is clearly better controlled with an embodiment in accordance with the invention, and the probability of a lead-in synchronization error at the time the read/write head accesses a sector can be reduced.

A further advantage over the prior art is that the number of zones achievable is more than that of the prior art, and the total recording capacity of the recording medium thereby is increased.

Figure 9:
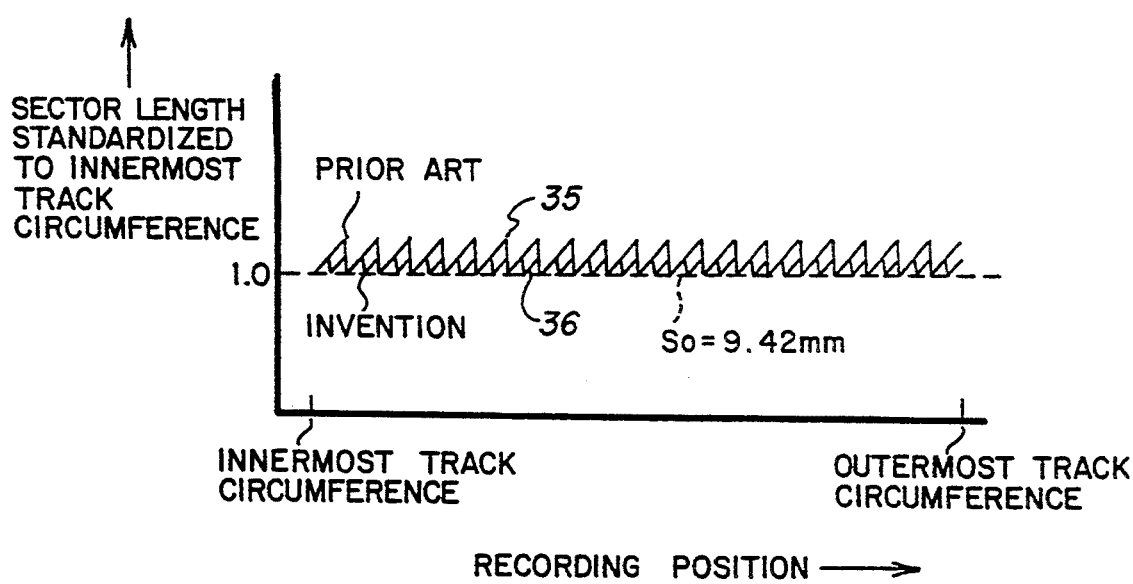
FIG. 9 is a graphical diagram of transitions occurring in sector length in an optical disc system in accordance with the invention.

FIG. 9 illustrates a comparison of transitions in sector length between a one sector increase per physical track as in the prior art as shown by the larger saw-tooth waveform 35, and a 0.5 sector increase per track as shown by the waveform 36. Although saw-tooth changes in sector length occur in each case, a return to $S_o$ occurs every 1,000 physical tracks in the prior art embodiment, whereas the sector length returns to $S_o$ every 500 physical tracks in the present embodiment of the invention. Thus, the sector length $S_o$ may be controlled in the innermost track to effect an increase in recording capacity.

Figure 10:
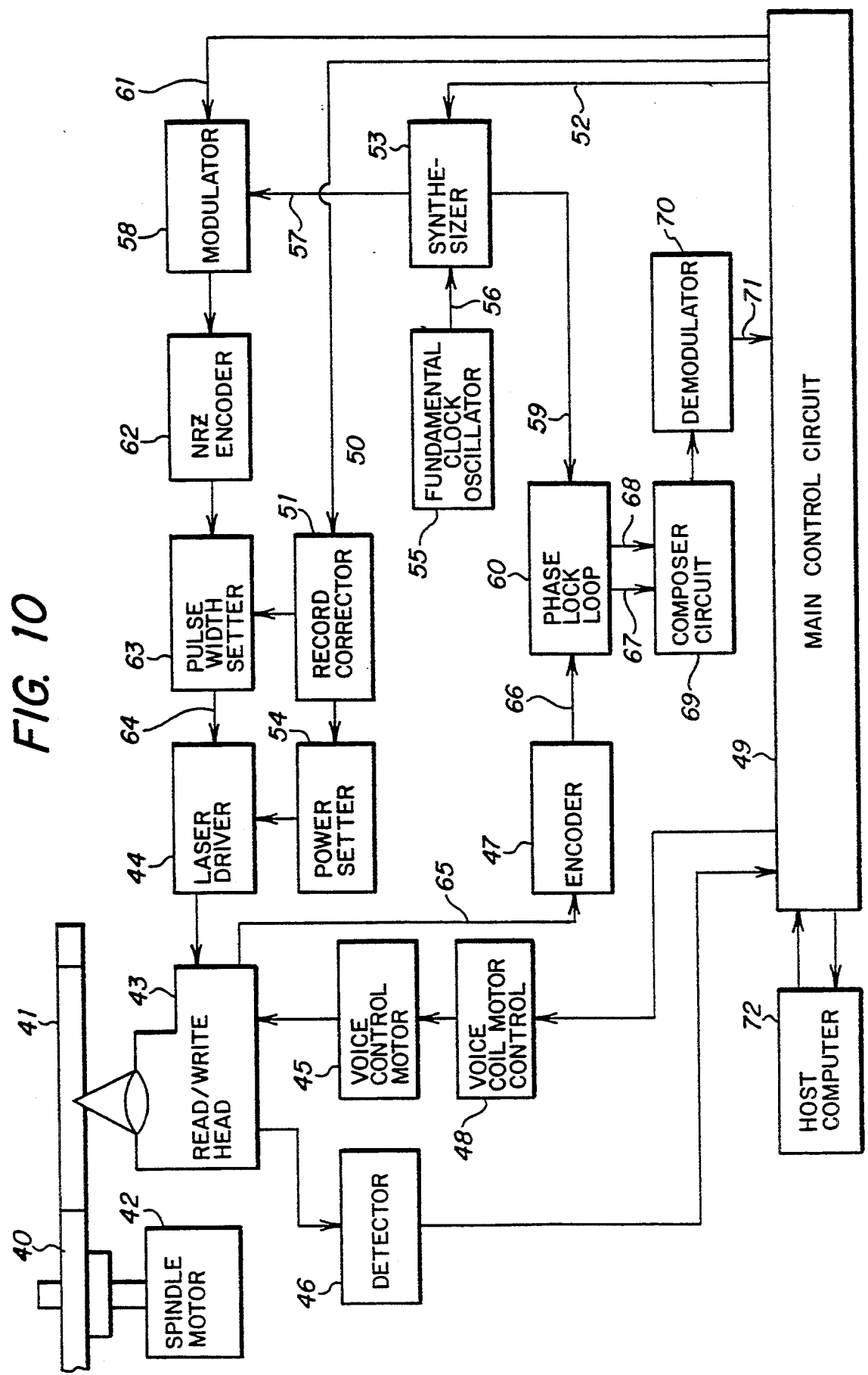
FIG. 10 is a functional block diagram of an optical disk system according to the invention.

FIG. 10 is a schematic diagram illustrating one embodiment of an optical disc system according to the invention. Referring to FIG. 10, an optical disc medium 40 includes a recording area 41, and is driven by a spindle motor 42. An optical read/write head 43, for recording and reading information from the optical disc medium 40, receives a laser element control signal from a laser driver 44, and a position control signal from a voice control motor (VCM) 45.

The read/write head 43 supplies a position indicator to a position detector 46, and an analog signal of information read from the recording area 41 to a binary encoder 47.

The VCM 45 is driven by a voice coil motor control 48, which in turn is responsive to commands received from a main control circuit 49.

The position of the read/write head 43 relative to the recording area 41 thus is controlled by a command loop including VCM 45 for placing the read/write head 43 in a target position, motor control 48 issuing position commands to VCM 45, the position detector 46 functioning as means for detecting the actual position of the read/write head 43 relative to the recording area 41, and main control circuit 49.

The command center controlling the operation of the optical disc system is the main control circuit 49, which also acts as a clock control system. Control circuit 49 issues control information by way of line 50 to a record corrector 51, and clock information by way of line 52 to a synthesizer 53.

The record corrector 51 sets a pulse width in responsive to the control information received on line 50 to control the operation of a power setter 54, which issues commands to the laser driver 44 to fine tune the power setting of the laser element of read/write head 43.

The synthesizer 53 receives a clock signal from the fundamental clock oscillator 55 by way of line 56. Synthesizer 53 also receives a read/write clock signal on line 52 corresponding to the particular tracks in registration with the read/write head 43, and issues a record clock signal on line 57 to a modulator 58. The synthesizer 53 also issues a read clock signal on line 59 to a Phase Lock Loop (PLL) circuit 60.

The modulator 58 receives data to be recorded on disc medium 40 from the main control circuit 49 by way of line 61, and modulates the data in accordance with a run-length limited (RLL) code such as the 2-7 modulation code. The modulated data is supplied to a NRZ (Non-Return To Zero) encoder 62, which applies the resulting NRZ code to a pulse width setter 63. The pulse width setter 63 in turn senses the pulse width correction information received from record corrector 51, and generates a recording code on line 64 to cause the laser driver 44 to power a laser element in read/write head 43.

The information recording control subsystem thus includes main control circuit 49; modulator circuit 58 for modulating recording data on line 61 to be written into a recording code having a run-length limited code array such as that provided by 2-7 modulation code; NRZ encoder 62 for further transforming the modulated code output of modulator 58 into an NRZ code; a pulse width setter 63 for setting, while correcting, the write pulse width of the NRZ code to generate a recording code on line 64; and a laser driver 44 for driving a laser element on the basis of the recording code to power the laser beam to the optical read/write head 43.

Figure 1A:
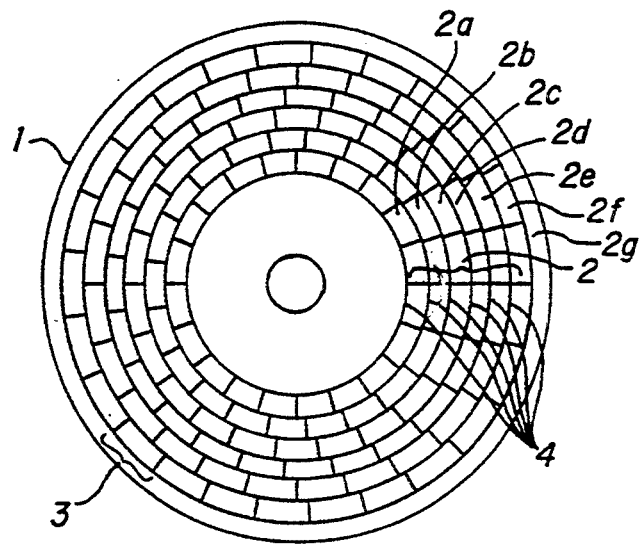
FIG. 1A is a physical layout of the recording surface of a disc-shaped recording medium as used in the prior art.
Figure 1B:
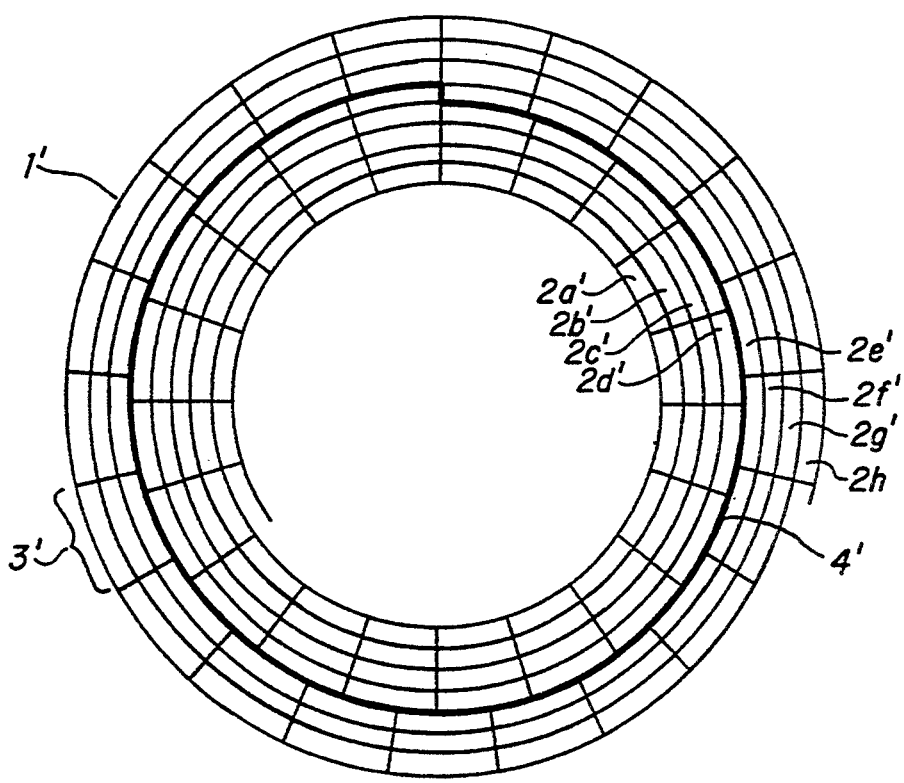
FIG. 1B is a physical layout of the recording surface of a disc-shaped recording medium for a MCAV system as used in the prior art.
Figure 2:
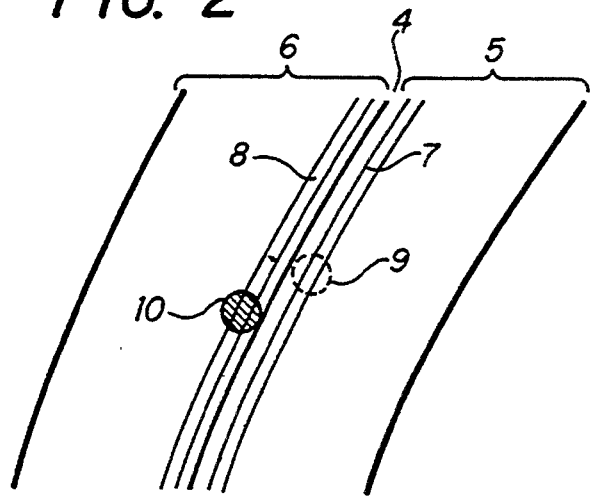
FIG. 2 is an illustration of an incorrect positioning of an optical read/write head during a read or write operation.

The data reproduction subsystem of the optical disc system of FIG. 1 includes binary encoder 47 for binary-encoding an analog data signal on line 65, which is detected by an optical detector in the read/write head 43. The encoder 47 generates a reproduction code on line 66 which is applied to one input of PLL circuit 60. The PLL circuit in synchronization with a read clock signal from synthesizer 53 on line 59 generates a synchronizing code on line 67 and a discrimination clock signal on line 68. The synchronization code on line 67 is applied to one input of a read data composer circuit 69, and the discrimination clock signal on line 68 is applied to a second input of the composer circuit. The composer circuit 69 generates an intermediate code of the read data signal from the synchronizing code on line 67 and the discrimination clock signal on line 68, and applies the intermediate code to a demodulator 70. Reproduced data thereupon is generated by the demodulator 70 on line 71 leading to one input of main control circuit 49.

In a data record operation, the main control circuit 49 fetches write data and write starting position information from a host computer 72. The control circuit 49 transforms the write starting position information into a track address and a sector address in accordance with a transformation table which is stored in a memory unit of the control circuit as will be further disclosed below. The motor control 48 controls the VCM 45 to move the laser beam of the read/write head 43 to the addressed track as identified by the main control circuit 49.

The method used for positioning the read/write head 43 at the target track includes using either track address information stored in advance in the header signal 24 of a sector such as sector 23 of FIG. 6, or providing an external scale and reading the scale to determine the head position with the position detector 46.

Moreover, the main control circuit 49 obtains the clock information on line 52 from a transformation of the track address indicated by position detector 46 by reference to a transformation table stored in main control circuit memory, as will be further explained below, and sends such information to the synthesizer 53 by way of line 52.

The synthesizer 53 generates record and read clock signals on lines 57 and 59, respectively, which are derived from the clock information on line 52.

Figure 11:
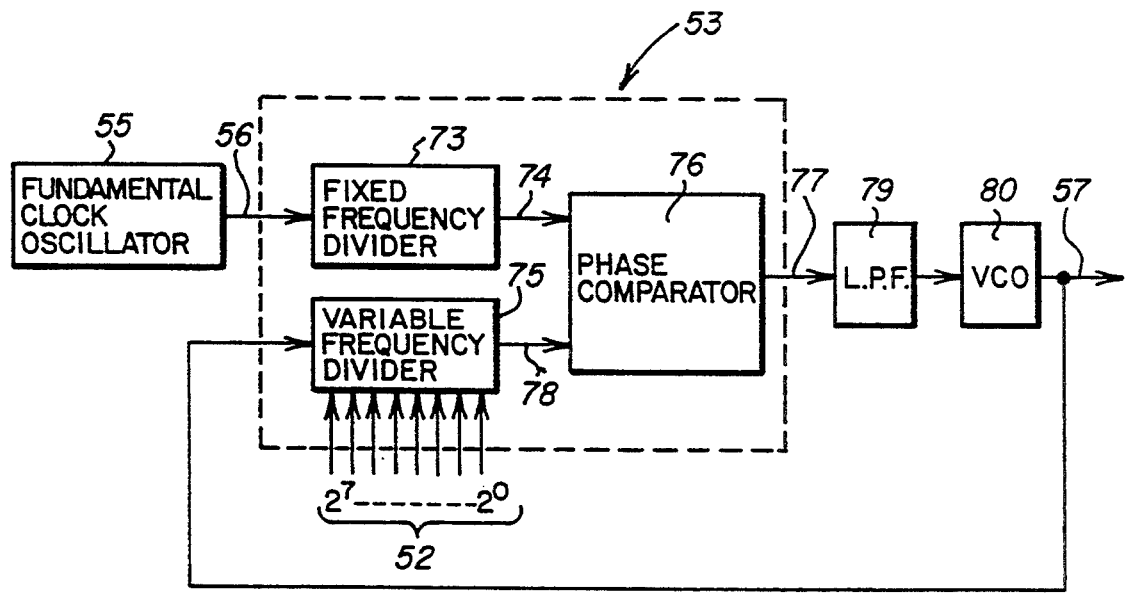
FIG. 11 is a functional diagram of synthesizer 53 of FIG. 10.

Referring briefly to FIG. 11, the synthesizer 53 divides the frequency of the fundamental clock oscillator 55 with a fixed frequency divider 73 to generate a reference clock signal on line 74. Further, a number of frequency divisions of the clock information on line 52 are performed by a variable frequency divider 75. A phase comparator 76 controls the frequency of the output signal on line 77, such that the frequency of the signal on line 78 and the frequency of the reference clock signal on line 74 are synchronized. The output signal 77 is applied through the low-pass filter 79 to a voltage controlled oscillator (VCO) circuit 80, which generates the record clock signal on line 57.

The frequency of the recording clock signal on line 57 may be held constant by feeding the clock signal back to the input of the variable frequency divider 75. As a result, the clock signal will correspond to the actual read/write head 43 access position.

Referring back to FIG. 10, the modulator 58 operates on the data received from the main control circuit 49 on line 61 to produce a RLL code such as a 2-7 code. The NRZ encoder 62 transforms the code from the modulator 58 into a NRZ code.

If the laser beam were to be irradiated in accordance with the NRZ code during the recording operation, a recording bit length longer or shorter than the NRZ code would be formed by the thermal diffusion characteristics of the optical disc medium.

These characteristics, which change with linear velocity, have to be corrected to achieve an optimum bit length. In order that the recording bit length or pit length may become coincident with the code length of the NRZ code, it is necessary to optimize the laser current for controlling the recording power of the laser. The pulse width of the NRZ code, therefore, is corrected in the pulse width setter 63 to generate the recording code on line 64, as now will be described in more detail by reference to FIG. 12.

Figure 12:
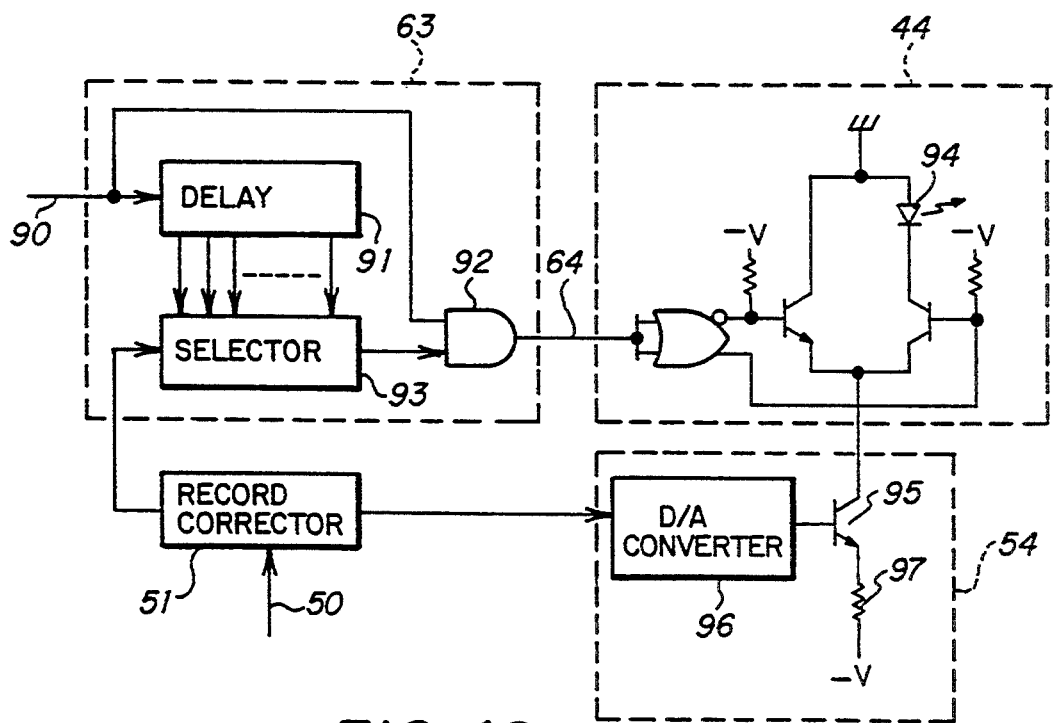
FIG. 12 is a functional block diagram of pulse width setter 63, power setter and laser driver 44 of FIG. 10.

FIG. 12 is a functional block diagram of pulse width setter 63, laser driver 44 and power setter 54. The NRZ code at the output of encoder 62 is applied to line 90 leading to the input of a delay element 91 of the pulse width setter 63, and to one input of AND gate 92. The delay element 91 produces plural signals having different constant delay times at a plurality of output taps.

The output taps of the delay element 91 are connected to inputs of the selector 93 for selection in response to commands received from the record corrector 51. The selected delay line signal is applied to a second input of AND gate 92. The output of AND gate 92 on line 64 is a NRZ pulse shortened by the selected delay amount. This shortened pulse corresponds to the recording code on line 64 of FIG. 10, which is fed to the input of laser driver 44.

The control of the optical power of the laser beam of the read/write head 43 is accomplished by changing the magnitude of the current supplied by a current source in the laser driver 44, which in turn controls the laser beam emission power. The semiconductor laser 94 of laser driver 44 is turned ON by changing the base potential of the transistor 95 as determined by the D/A converter 96. If the base potential of the transistor 95 is raised by the D/A converter 96, for example, the emitter potential rises to increase the current flow through the resistor 97. As a result, the semiconductor laser 94 has its drive current increased to increase the emission power of the laser.

The record corrector 51 sets the pulse width on line 64, and thus the laser power in accordance with the control information on line 50.

According to the methods described above, the recording optical pulse can be corrected to an optimum value, in the recording position, to form on the disc medium 40 a recording bit having the same length as that of the NRZ code pulse.

It is to be understood in practicing the above methods, that the delay element 91 of FIG. 12 could be replaced by a logic gate delay, that the AND gate 92 could be replaced by an OR gate to widen rather than shorten the NRZ pulses, and that a ROM memory could be used instead of record corrector 51 to generate commands for selector 93 and converter 96.

Further, the output of position detector 46 of FIG. 10, the clock information on line 52, a position indicator indicating the number of tracks that have been crossed from the innermost circumference of the innermost track to the position of the read/write head 43, or the track address of the current track in registration with read/write head 43 may be used to achieve results similar to that of FIG. 12.

A data reproduction process now will be described with reference to FIG. 10. In a read operation, the main control circuit 49 fetches information indicating the read starting position from the host computer 72, and executes operations similar to those of the recording operations to position the read/write head 43 in registration with the target track. The emission power of the laser is adjusted to the reproduction level to irradiate the optical disc medium 40 with the laser beam. As a result, the data on the medium are received as an optical signal, and are transformed into the data reproduction signal on line 65 by the optical detector of the read/write head 43. The reproduction signal is encoded by the binary encoder 47, and thereafter is applied through the PLL circuit 60 to the composer circuit 69.

The main control circuit 49 also derives a track and sector address, and the clock information on line 52, from the read starting position information supplied by host computer 72. The control circuit sends the clock information to the synthesizer 53 on line 52. In response to the clock information, the synthesizer generates record and read clock signals on lines 57 and 59, respectively, as before described.

Figure 13:
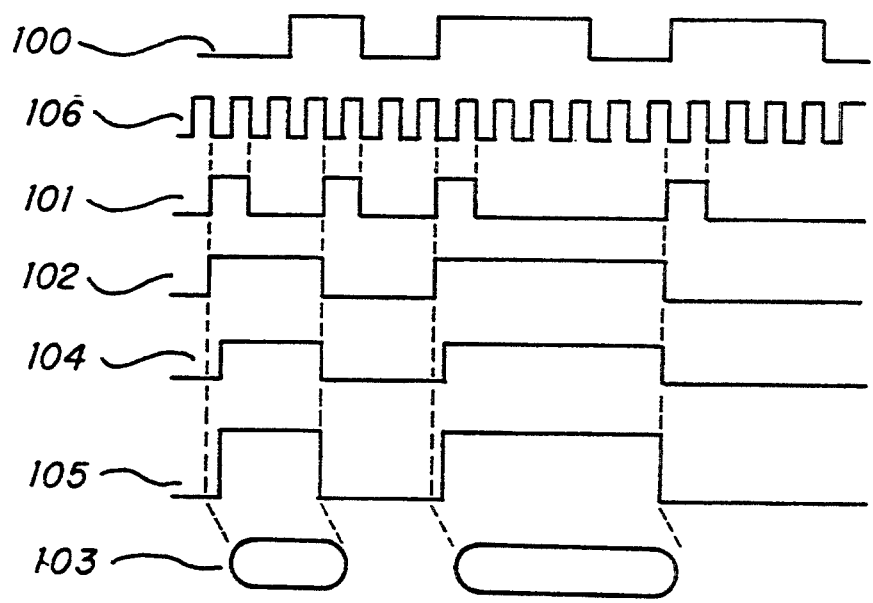
FIG. 13 is a graphic diagram of waveforms produced by the optical disc system of FIG. 10 in the recording of data.

The principles of the pit edge recording methods used in the present invention now will be further described below with reference to FIG. 13, which is a waveform chart of electrical signals generated during a recording of data on the optical disk medium 40 of FIG. 10.

In the description below, periodic references to FIG. 10 will be made while explaining the waveforms of FIG. 13. During either a write or a read operation, the optical disc medium 40 is turned at a constant angular velocity by the spindle motor 42. As before described, the data 100 to be recorded is modulated into a code 101 by the modulator 58 of FIG. 10. This encoding may be effected by any modulation method, and is exemplified by a 2-7 modulation in the present embodiment as shown by code 101. The code thereafter is transformed into a NRZ code 102 by the NRZ encoder 62 of FIG. 10.

If the NRZ code were to be recorded on the optical disc medium 40, a pit which is longer than a code length generally will be formed. This is because the heat of the laser beam will propagate beyond the intended code length to melt adjacent areas of the recording film. Depending upon the relation between the melting point of the recording medium and the irradiated optical power, the pit also could be shorter than the NRZ code lengths.

In order to cause the length of a recording pit as illustrated by diagram 103 to be formed of a length nearly equal to the NRZ code bits, therefore, a recording code 104 is used which has a pulse width corrected in advance. Moreover, the power of a recording optical pulse 105 is corrected in accordance with the linear velocity of the optical disc medium 40 at the time of recording. The settings of the recording optical pulse width by pulse width setter 63, and the laser beam power by the power setter 54, occur under the control of the record corrector 51 of FIG. 10. In response to these settings, the laser driver 44 of FIG. 10 drives the laser to form the recording pits as illustrated by diagram 103. Specifically, the front and rear edges of the pits thus formed correspond to the 2-7 code "1", so that the data are efficiently recorded on the optical disc medium 40.

In a data reproduction process as illustrated in FIG. 4, the data 107 is read from the optical disc medium. More particularly, the light reflected from the optical disc medium 40 at the time of irradiation by the laser beam changes optically with the presence or absence of a recording pit as illustrated by diagram 108. The reproduction signal 109 is generated in the form of an analog signal, which is binary-encoded by the binary encoder 47 of FIG. 10 to generate the reproduction code 110 through use of a certain slice level 111.

According to another method, the binary reproduction code 110 also may be produced by differentiating the reproduction signal 109 to the second order, and by detecting resulting zero cross points.

Figure 14:
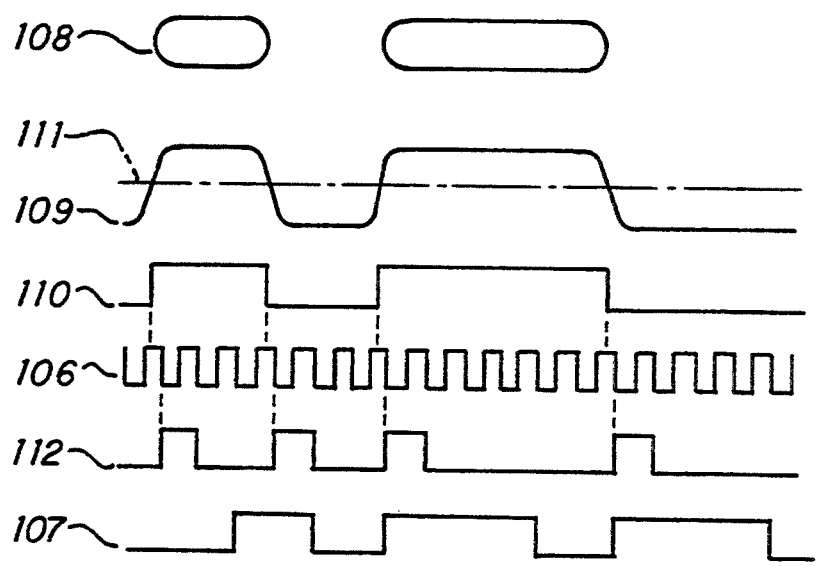
FIG. 14 is a graphic diagram of waveforms produced by the optical disk system of FIG. 10 during the reading of data from the optical disc medium 40.

From the rising and breaking edges of the reproduction code 110, there are formed corresponding pulses to produce the code 112. The code 112 is applied to the demodulator 70 of FIG. 10 to produce the data as illustrated by waveform 107. Both FIGS. 13 and 14 illustrate a same read/write clock signal 106 for easy comparison.

As before described, in a MCAV optical disc system as used in the present invention, the read/write clock frequency and the number of zones within the disc recording area change as the number of sectors per physical track change. If frequency switching at zone boundaries is not carefully controlled, the recording bit length will become shorter for the outer circumference so that a recording pit of a desired length cannot be formed, and data cannot be read out at the time of data reproduction.

In the present embodiment, the recording bit lengths in each zone are equalized at the zone boundary by equalizing the sector lengths of each zone at the boundary. Thus, the recording capacity can be enhanced while making the data recording densities substantially equal in each zone.

A recomposing method is used in the pit edge techniques of the present invention which processes data corresponding to both the front and the rear pit edges individually. Front edge pulses and rear edge pulses correspond to the rising edge and the breaking edge of the reproduction code 66 produced by the binary encoder 47 of FIG. 10.

The PLL circuit 60 generates the discrimination clock 68 which is synchronized with the reproduction code and the synchronization code 67. It is to be understood that the discrimination clock 68 is synchronized with the reproduction code on line 66, and is generated by the PLL circuit 60 of FIG. 10, as the output of composer circuit 69 is produced from the reproduction code on line 66 as illustrated in FIG. 10. With respect to each recording pit from which data is read, one series of data and clock signals are produced at the leading edge of the pit, and a second series is produced at the trailing edge. During the leading-in time of the reproduction operation, the read/write clock signal 59 is used as the reference clock. The outputs from the PLL circuit 60 are issued to the composer circuit 69, which derives two series of intermediate coded signals from the composition of the synchronizing code 67 at the front edge and the rear edge of the recording pit.

The two series of coded signals then are applied by the composer circuit 69 to the demodulator 70 to provide reproduced data on line 71.

The operation of the main control circuit 49, in conjunction with the before-mentioned transformation tables in accordance with the invention, will now be described.

Figures 15, 16:
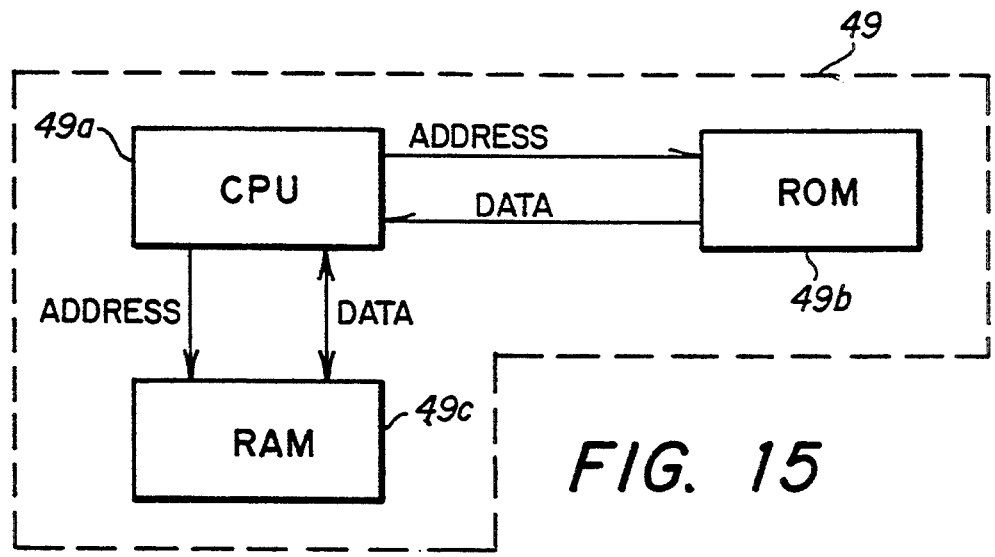
FIG. 15 is a functional block diagram of the main control circuit 49 of FIG. 10.
FIG. 16 is a transformation table used by the main control circuit 49 of FIG. 10.

Referring to FIG. 15, main control circuit 49 is shown to be comprised of a CPU 49a, a ROM 49b, and a RAM 49c. Transformation tables as illustrated in FIGS. 16 and 17 are stored in the ROM 49b. Referring to FIG. 16 in conjunction with FIG. 10, column 120 includes the clock information on line 52; column 121 refers to the address of track pairs having a same address; column 122 refers to the number of physical tracks between zone boundaries where a change in read/write clock frequency at the outputs of synthesizer 53 occur; column 123 indicates the number of physical tracks constituting a single one of the track addresses shown in the corresponding horizontal entry in column 121; and column 124 indicates the read/write clock frequencies occurring at the zone boundaries depicted in column 122.

Looking at column 124, a read/write clock frequency $f_o$ in the innermost zone, having logical track addresses 0 to 249, is expressed by the following equation, where the optical disc medium 40 has a rotational speed of A r.p.m., the constant K is equal to the number of physical tracks in a logical track, the number of sectors within a logical track address in the innermost circumferential zone is m, and the total bit number of one sector is Z:

$$f_o = 2 \times A/60 \times m/k \times Z \text{ (Hz)}.$$

On the other hand, a read/write clock-frequency $f_1$ for the next succeeding outward circumferential zone is represented by the following equation:

$$f_1 = 2 \times A/60 \times (m+1)/k \times Z \text{ (Hz)}.$$

The factor of 2 in the above two equations is a result of the doubling of bits required by a 2-7 code modulation. In the embodiment of the invention represented by the transformation table of FIG. 16, the read/write clock frequency as represented in column 124 increases in equal steps at the zone boundaries as the sectors increase by one from zone to zone. As before described, the number of physical tracks per logical track as shown in column 123 may be increased to reduce the rate of increase in the read/write clock frequency as depicted in column 124. Through control of the number of physical tracks per logical track as indicated in column 123, the change in read/write clock frequency may be held below a constant value to remain within the lead-in abilities of the PLL circuit 60.

As illustrated in FIG. 8, if the change in read/write clock frequency must be suppressed below 4% to remain within the lead-in capability of the PLL circuit 60, prior art systems would fail within the inner circumference areas of the disc medium 40 as indicated by graph 33. With disc system embodiments in accordance with the invention as represented by graph 34, however, the suppression requirement may be achieved.

A comparative look at the leading half of graph 34 and the trailing half of graph 33 of FIG. 8 also indicates that the control over the change in the read/write clock frequency may be achieved where the number of physical tracks per logical track is two from the innermost to an intermediate circumference of the recording area 41, and outward thereafter is one physical track per logical track as shown in the transformation table of FIG. 17.

Referring to FIG. 17, a transformation table is shown wherein column 125 includes the clock information on line 52 of FIG. 10; column 126 refers to the address of physical track pairs having a same address, and to addresses of single physical tracks; column 127 refers to the number of physical tracks between zone boundaries; column 128 indicates the number of physical tracks constituting a single logical track corresponding to one of the track addresses shown in the corresponding horizontal entry in column 126; and column 129 indicates the read/write clock frequency occurring at the zone boundaries depicted in column 127.

A frequency $f_j$ appearing in column 129 of FIG. 17 is expressed by the following equation:

$$f_j = 2 \cdot A/60 \times \{30 + (j-20)\} \cdot Z \text{ (Hz)},$$

where $20 \leq j \leq 29$.

Here, the factor of $\{30+(j-20)\}$ refers to the number of sectors per track in the jth zone.

Figure 18:
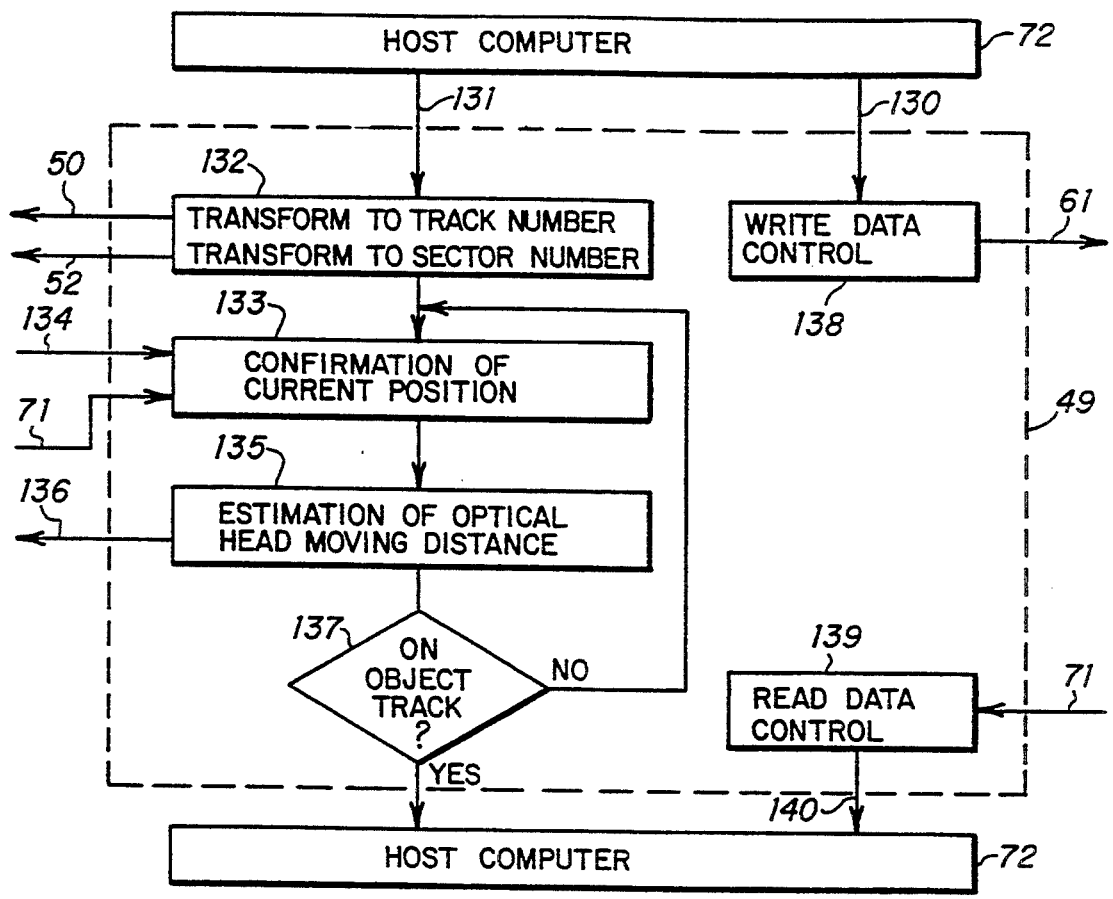
FIG. 18 is a logic flow diagram of the operation of the main control circuit 49 of FIG. 10 during read and write operations.

The interaction of the main control circuit 49 with the transformation tables of FIGS. 16 and 17 will now be discussed with reference to FIGS. 10 and 18. FIG. 18 is a logic flow diagram of the steps executed by circuit 49 in a write and read operation.

In a data recording operation, the main control circuit fetches write data on line 130 and write start position information on line 131 from the host computer 72. Circuit 49 thereafter accesses a transformation table such as those illustrated in FIGS. 16 and 17 to transform the position information into a track address and an address of a sector within the addressed track as indicated by functional block 132.

Based upon the track and sector address information, the data record process issues the corresponding clock information of, by way of example, columns 120 or 125 of FIGS. 16 and 17, respectively, to synthesizer 53 by way of line 52. In addition, control information for laser power and record code pulse setting is provided on line 50.

From functional block 132, the data record process proceeds to functional block 133 where it receives track address information from demodulator 70 by way of line 71, and position information from position detector 46 by way of line 134, to confirm that the read/write head 43 has been correctly placed at the start position.

The data record process thereupon proceeds from functional block 133 to functional block 135 where an estimation of the travel distance of the read/write head 43 is generated, and is issued to the voice coil motor control circuit 48 by way of line 136.

From functional block 135, the data record process proceeds to logic step 137 to determine whether the read/write head has arrived at its intended position. If not, the process loops back through functional blocks 133, 135 and 137 until the read/write head is correctly positioned on the desired track. At that time, the control circuit 49 so notifies the host computer 72, and data received from the host computer at the write data control functional block 138 is applied by way of line 61 to modulator 58 of FIG. 10.

In a read operation, the main control circuit 49 fetches read start position information from the host computer 72 and executes operations similar to those of the record operation to position the read/write head 43 at the desired track location. Upon data being read from the disc recording area 41, and processed as before described in connection with FIG. 10, the reproduced data is received at functional block 139 from demodulator 70 by way of line 71. The reproduced data thereafter is supplied to the host computer 72 by way of line 140.

Figure 19:
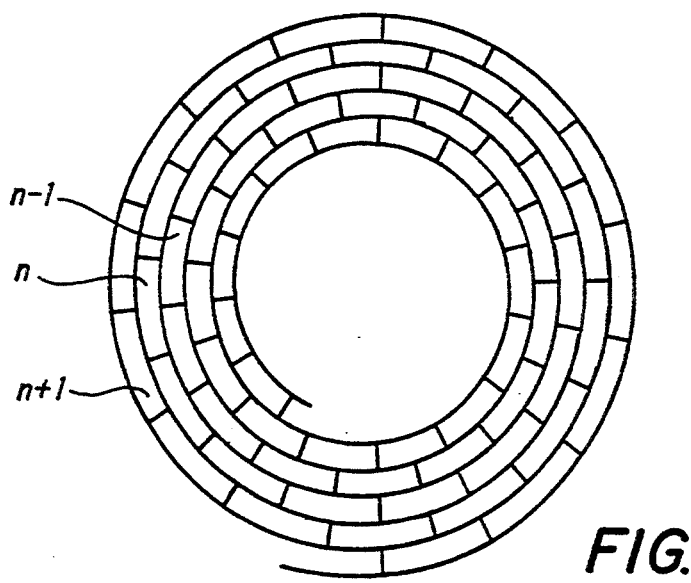
FIG. 19 is an illustration of the physical layout of a recording medium for an optical disk system in accordance with the invention, wherein header signals occurring in tracks on either side of a target or designated track are radially aligned.

The foregoing individual embodiments have been described in the case where the number of physical tracks per logical track address is two. In this embodiment, not only the processing can be simplified, but also the header signals of the inner and outer tracks adjacent to a target track may be radially aligned, even in the case where the number of sectors assigned to an identical logical track address are either even or odd in number. Specifically, when the number of sectors in the physical tracks having an identical address is even, the header signals of all of the tracks in a same zone are arranged on one transverse line so that the headers of the inner and outer tracks adjacent to a target track are radially aligned. In the event the number of sectors in the physical tracks having a same logical track address is odd, on the other hand, the headers between the adjacent tracks are staggered, as shown in FIG. 19. That is, the inner and outer tracks (i.e., the (n−1)th track and the (n+1)th track) adjacent to the target track (the nth track) are also radially aligned to each other. As a result, no matter whether the sector number is odd or even, the influences of the cross-talk between header signals (which may occur because of prepitting) coming from the inner and outer tracks are canceled with respect to the target track. Thus, there arises an advantage that the tracking characteristics of the optical read/write head 43 can be improved.

The postscript type optical disc for forming oval pits in its disc-shaped medium having spiral tracks has been described as the recording medium which is used in the foregoing embodiments of the invention. It is to be understood that the invention may likewise be embodied with other optical disc mediums such as an optomagnetic/phase-change medium, a magnetic disc medium or a flexible disc medium.

Moreover, the present invention theoretically may be applied to a disc in which the tracks are concentric. Since the number of sectors per physical track may include a fraction of a sector in the present invention, however, there arises the problem of the sectors being divided midway in the concentric tracks. In order to avoid this problem, a preferred embodiment of the invention includes spiral tracks.

It should be understood by those skilled in the art that additional variations may be made in the disclosed embodiments without departing from the spirit and scope of the invention as defined by the appended claims.

What is claimed is:

1. A method of controlling the rate of change of a read/write clock frequency driving a read/write head in recording or reading information on a disc recording medium, which comprises the steps of:
   forming a plurality of spiral recording tracks on said recording medium;
   forming a plurality of logical tracks on said recording medium, wherein each of said logical tracks is comprised of at least one of said spiral recording tracks;
   dividing each of said logical tracks into a plurality of sectors;
   dividing said recording medium into a plurality of circumferential zones, with each of said zones comprised of one or more said logical tracks;
   wherein each of said zones has one or more of said sectors than a radially-adjacent inner one of said zones, and one less of said sectors than a radially-adjacent outer one of said zones;
   changing said read/write clock frequency as a function of the number of said sectors in said zones which are traversed by said read/write head during a reading or recording of information on said medium;
   storing in each of said sectors an information header including a clock pattern;
   synchronizing said read/write clock frequency with said clock pattern after said read/write head has been positioned on said recording medium;
   wherein said information header of said sectors only in every other one of said spiral tracks are radially aligned on said recording medium.

2. A disc recording medium for operating at a constant angular velocity in an optical disc system adapted for recording and reading information on said medium in response to a read/write clock frequency, said medium comprising:
   a plurality of spiral recording tracks, each of said tracks having a plurality of information sectors, and each of said sectors being provided with an information header having a clock pattern to accommodate synchronization with said read/write clock frequency;
   a plurality of circumferential zones, each of said zones comprising plural ones of said tracks, wherein at least pairs of said tracks have a same track address, each of said zones having one or more of said sectors than an adjacent radially inner zone, and one less of said sectors than an adjacent radially outer zone;
   wherein said information header of said sectors only in every other one of said spiral tracks are radially aligned on said medium.

3. A method of controlling the rate of change of a read/write clock frequency in a MCAV optical disc system having a read/write head recording and reading information on a recording medium in response to said read/write clock frequency, comprising the steps of:
   forming a plurality of spiral recording tracks on said medium, each of said tracks being further provided with a plurality of information sectors, and each of said sectors being provided with an information header having a clock pattern to accommodate synchronization with said read/write clock frequency;
   creating a plurality of circumferential zones, each of said zones comprising a plurality of said tracks, wherein at least pairs of said tracks have a same track address, each of said zones has one more of said sectors than an adjacent radially inner one of said zones, and one less of said sectors than an adjacent radially outer one of said zones, and wherein increments in number of said sectors in each of said tracks in proceeding radially from an innermost one of said tracks to an outermost one of said tracks is substantially less than one; and
   changing said read/write clock frequency at zone boundaries in proceeding from inner to outer ones of said zones, wherein said read/write clock frequency is a function of number of said sectors in each of said tracks of each of said zones.

* * * * *